United States Patent [19]

Haynes

[11] 4,282,902
[45] Aug. 11, 1981

[54] VALVE APPARATUS FOR SIMULTANEOUS CONTROL OF A PLURALITY OF FLUID PATHS

[75] Inventor: John L. Haynes, Redwood City, Calif.

[73] Assignee: Becton Dickinson & Company, Paramus, N.J.

[21] Appl. No.: 35,835

[22] Filed: May 4, 1979

[51] Int. Cl.³ .............................................. F17D 3/01
[52] U.S. Cl. ................... 137/636.1; 128/274; 137/595; 251/9; 251/251; 251/297
[58] Field of Search ............... 137/595, 636.1; 251/4, 251/7, 9, 10, 251, 297; 128/274

[56] References Cited

U.S. PATENT DOCUMENTS

| Re. 22,429 | 2/1944 | Martin | 137/636.1 |
| Re. 22,439 | 2/1944 | Ellinwood | 137/636.1 |
| 2,300,112 | 10/1942 | Ellinwood | 137/636.1 |
| 3,016,915 | 1/1962 | Moeller, Jr. | 137/636.1 |
| 3,128,635 | 4/1964 | Doolittle | 137/636.1 |
| 3,490,495 | 1/1970 | Green | 137/636.1 |
| 3,550,619 | 12/1970 | Halasz | 137/595 |
| 3,894,719 | 7/1975 | Horvath et al. | 137/636.1 |
| 3,918,490 | 11/1975 | Goda | 251/9 |
| 4,061,142 | 12/1977 | Tuttle | 251/9 X |
| 4,131,126 | 12/1978 | Chromik | 251/297 |

FOREIGN PATENT DOCUMENTS

| 75543 | 5/1961 | France | 251/9 |
| 798414 | 7/1958 | United Kingdom | 137/595 |

Primary Examiner—Martin P. Schwadron
Assistant Examiner—G. L. Walton
Attorney, Agent, or Firm—Flehr, Hohbach, Test, Albritton & Herbert

[57] ABSTRACT

Valve apparatus controls fluid flows in ten flexible tubes. The tubes are opposite each other in pairs and associated with each of five cams. One half of each cam provides cam surfaces which close and open one tube, and the other half, the opposite tube. With this arrangement five switch positions, which are equal to the number of cams, can be provided.

8 Claims, 13 Drawing Figures

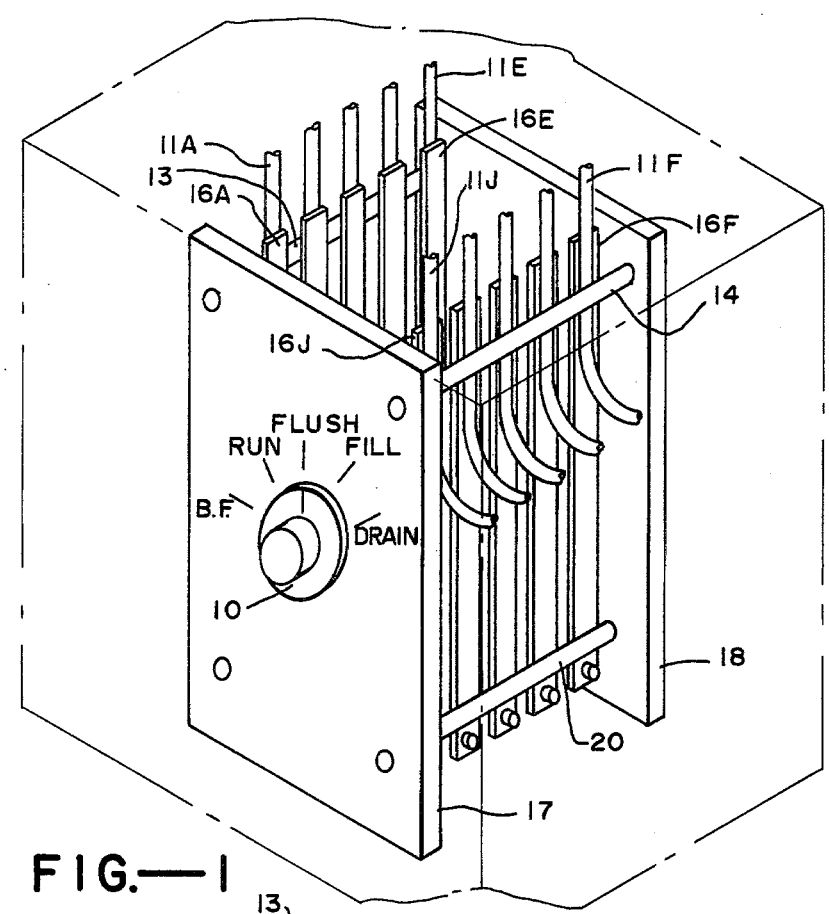
FIG.—1
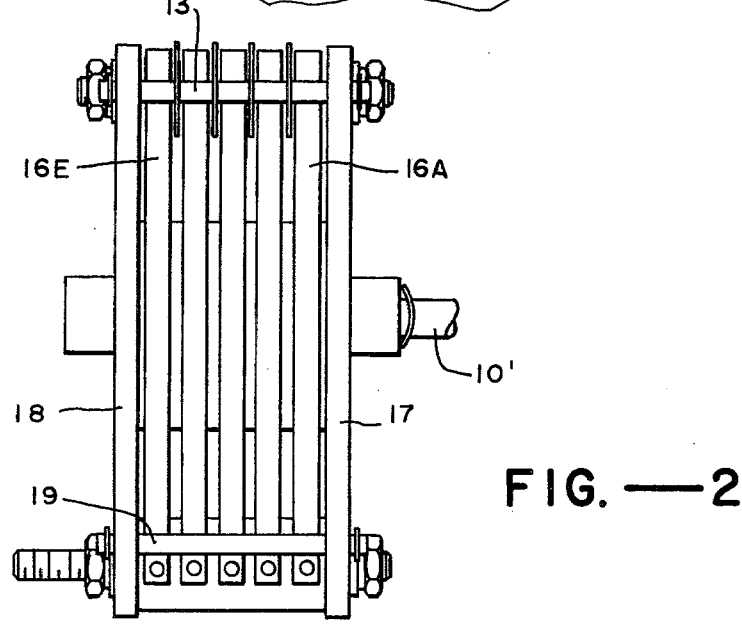
FIG.—2

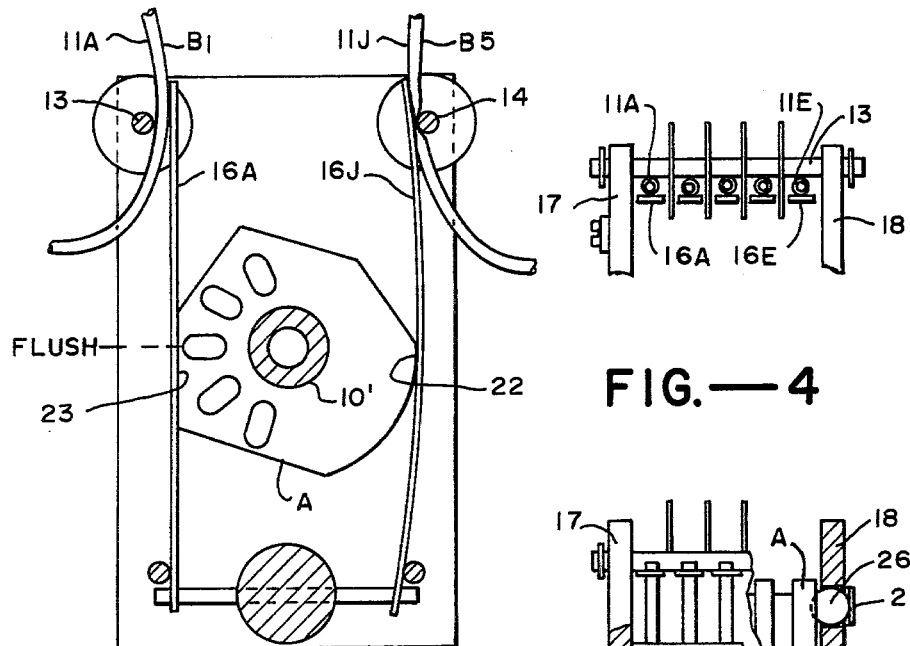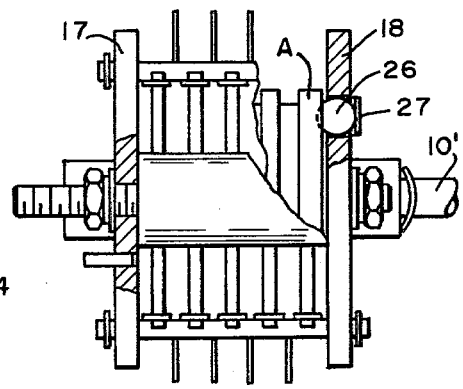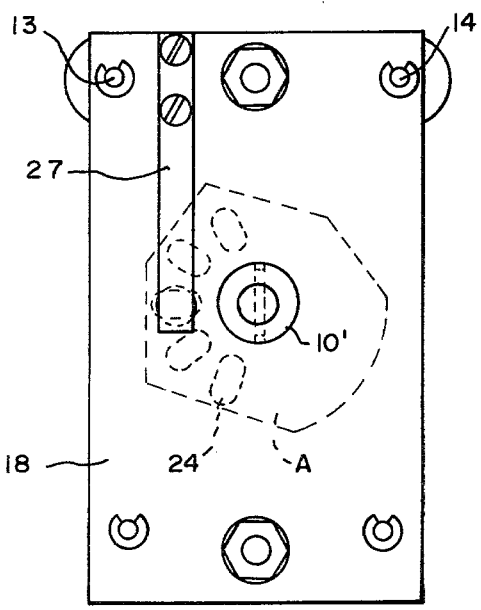

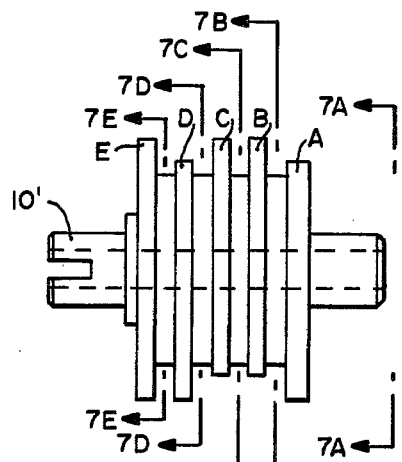
FIG.—7
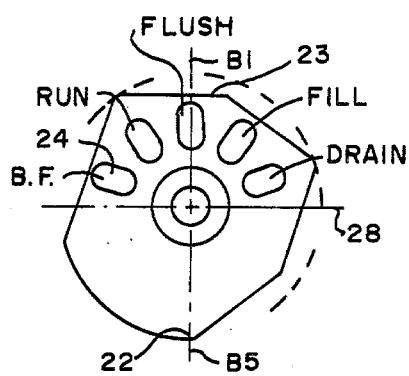
FIG.—7A
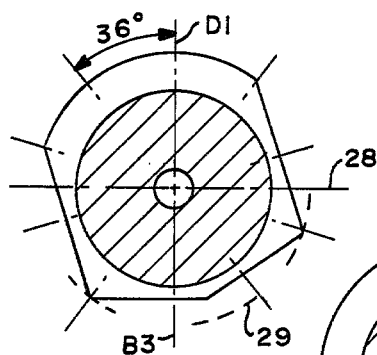
FIG.—7C
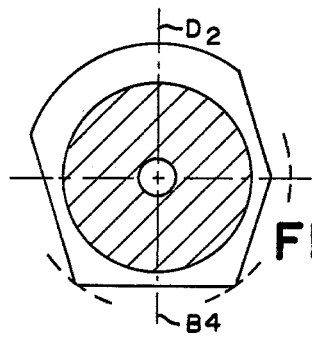
FIG.—7B
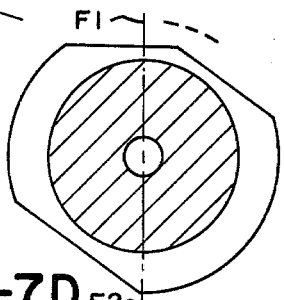
FIG.—7D
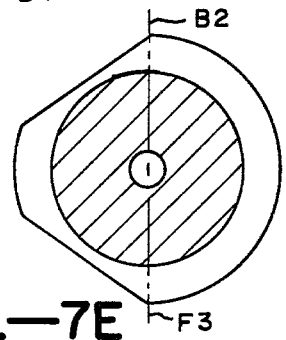
FIG.—7E
|  | B1 | B2 | B3 | B4 | B5 | F1 | F2 | F3 | D1 | D2 |
|---|---|---|---|---|---|---|---|---|---|---|
| DRAIN | X | X | O | O | X | X | X | X | O | O |
| FILL | O | — | X | X | X | O | O | O | X | X |
| FLUSH | O | — | O | X | X | O | X | X | X | X |
| RUN | X | O | O | X | O | X | X | X | X | X |
| B. FLUSH | O | X | X | O | O | X | X | X | X | X |
O = OPEN
X CLOSED
FIG.—8

VALVE APPARATUS FOR SIMULTANEOUS CONTROL OF A PLURALITY OF FLUID PATHS

The present invention is directed to a valve apparatus for simultaneous control of a plurality of fluid paths.

In a typical fluid valving arrangement, especially for laboratory type devices, several fluid paths must be opened and closed simultaneously. A typical example of the way in which this is done is shown in U.S. Pat. No. 3,550,619, assigned to the present assignee, where a single rotatable shaft includes a number of cams, each associated with a particular flexible tube. A cam, when its surface is rotated, compresses the associated tube to close it. In a relatively simple device, with only a few flow paths, the above technique was adequate. However, where for example there are ten or more flow paths with associated tubes which must be opened and closed simultaneously, the foregoing structure becomes bulky and mechanically cumbersome in operation.

It is thus an object of the present invention to provide an improved valve apparatus.

It is a more specific object to provide valve apparatus which is especially useful with a great number of flow paths but which is still compact and mechanically simple and reliable in operation. In accordance with the above objects, there is provided a valve apparatus for simultaneously controlling the flow of fluids in a plurality of flow paths. The apparatus includes a rotatable shaft and a plurality of cams mounted in parallel planes on the shaft for rotation. Each of the cams has a plurality of cam surfaces. Detent means provide a predetermined plurality of switch positions for the shaft and cams. The apparatus also contains a plurality of flexible tubes providing the flow paths for the fluids. Each unique pair of tubes is located in a plane corresponding to a unique cam. Rigid abutment means are located on the opposite side of the tubes from the cam surfaces. The cam surfaces of the cams have preselected radii from the axis of rotation of the shaft to selectively compress closed a tube against the abutment means when the shaft is rotated to a particular switch position.

FIG. 1 is a simplified perspective view, partially in phantom, of the valve apparatus embodying the present invention.

FIG. 2 is a simplified side view of a portion of FIG. 1.

FIG. 3 is a cross-sectional view of FIG. 2.

FIG. 4 is a simplified top view of FIG. 3.

FIG. 5 is another sectional view similar to FIG. 3, but taken at a different location.

FIG. 6 is a top view of FIG. 5.

FIG. 7 is a side view of a cam portion of FIGS. 1 and 2.

FIGS. 7A through 7E are cross-sectional views along lines 7A—7A through 7E—7E.

FIG. 8 is a table useful in understanding the operation of the invention.

The valving arrangement of the present invention is ideally used in a blood-platelet counting apparatus which is disclosed in patent application Ser. No. 780,402 filed Mar. 23, 1977 in the name of John L. Haynes, assigned to the present assignee, and now patent number 4,165,484. As shown in that patent, several fluid flow paths must be controlled simultaneously by several valves, as also illustrated in the table of FIG. 8 of the present invention. The valves are designated B1 through B5, F1 through F3, and D1 and D2. There are ten fluid flow paths which must be simultaneously controlled. There are five switching modes designated DRAIN, FILL, FLUSH, RUN and BACKFLUSH. The table indicates whether a switch is open or closed.

FIG. 1 illustrates the actual manual control knob 10 of the switch with the five switching positions being indicated with the same legends as in FIG. 8. In addition, the ten flow paths are shown as being provided by the ten flexible tubes 11A through 11J. The entire valve apparatus is surrounded by a metal box 12 shown in phantom which provides for electrical shielding from the remainder of the laboratory apparatus. This may be especially important in a platelet counter which uses the so-called Coulter counting principle, where the passage of particles through a narrow orifice creates an electrical pulse which is counted. As is apparent from the FIG. 1, each of the tubes 11A through 11J lie against and between rigid abutments rods 13 or 14 respectively, and the ends of levers 16A through 16J. Both the tubes and levers are paired and located opposite each other. The abutment rods 13 and 14 are held in their position by plates 17 and 18. In addition, the other end of the levers 16 are pivoted on similarly held rods 19 and 20, as best shown in FIG. 2.

Now referring to FIG. 2, journaled for rotation in plates 17 and 18 is a shaft 10' which is rotated by the manual control knob 10. As shown in FIG. 7, shaft 10' carries on it for rotation five cams designated A through E.

FIGS. 3 and 4 illustrate the operation of cam A. As is apparent, cam A is located in the same vertical plane as the tubes 11A, 11J and the associated levers 16A and 16J. In the position shown, it has one cam surface 22 which is pressing against the mid-point of lever 16J to cause the free end of the lever to compress tube 11J against the abutment 14 to thus close it. On the opposite side, the cam surface 23, because of its smaller radius, is not compressing the tube 11A; thus that valve is open. Tubes 11A and 11J are, in this embodiment, effectively valves B1 and B5 of Table 8. In addition, the shaft 10' as also illustrated in FIG. 1, is in the FLUSH switch position. Note on the table that B1 is shown as open, and B5 is shown as closed.

FIG. 4 better illustrates the location of the tubes 11A through 11E between the rod 13 and the associated levers 16A–16E. It is quite apparent that the free end of the lever 16E moves only a very slight distance to compress closed its associated tube. This is one reason for the ease of mechanical operation of the valve apparatus of the present invention.

FIGS. 5 and 6 illustrate the detent arrangement for the valve apparatus, where cam A has five holes 24, one for each of the switching positions, into which is placed the free ball 26 as illustrated in FIG. 6 which is biased against the respective holes 24 by a leaf spring 27.

Referring again to FIG. 3, all of the levers 16 are flexible leafs of metal, as is apparent by the end shown in lever 16J, so that the force applied to any particular tube is fairly constant despite tolerance variations of the tube itself. For example, in the present invention, a typical tube is made of SILASTIC (a trademark) with an outer diameter of ⅛ inch and an inner diameter of 1/16 inch. In the open position, the lever 16 is just barely touching the tube, and in the closed position, the lever must move approximately 1/16 inch and applies a one-pound force. Moreover, it is preferred that the diameter of the abutment rods 13 and 14 is approximately the same as the tubing.

FIGS. 7A through 7E illustrate the five cams of the present invention and their associated cam surfaces. They show the shaft 10' being rotated to the FLUSH position as described above in conjunction with the table of FIG. 8. For example in FIG. 7A, where the cam A is associated with the tubes or valves B1 and B5, these are respectively open and closed because of the associated cam surfaces 23 and 22. Similarly and still referring to the table, FIG. 8, the cam of FIG. 7B is associated with tubes or valves D2 and B4, which are closed and open; in FIG. 7C the valves B1 and B3, which are closed and open; in FIG. 7D, with the valves F1 and F2 which are open and closed; and in FIG. 7E with the valves B2 and F3 which are both closed. The table in FIG. 8 indicates in the case of valve B2 with a line that whether the valve is open or closed is irrelevant for this particular FLUSH function.

FIG. 7A illustrates the five switch positions as being angularly displaced from each other by 36°. This was arrived at by dividing the total number of degrees in a circle, that is 360°, by twice the number of switch positions. With five switch positions, this results in 36°. As is apparent from examination of FIGS. 7A or 7C, relating to the horizontal line 28, there are five cam surfaces above line 28 which are uniquely related to the tube or valve D1 and five cam surfaces on the lower half of the cam uniquely related to B5. Each cam of course thus has double the number of cam surfaces as there are cams. As is obvious with ten valves, and thus ten tubes to open and close in five different modes there are 50 "pieces" of data to be determined. Thus with only five cams, there must be ten cam surfaces. The number of cam surfaces is also equal to the number of tubes or valves. And of course, since two tubes forming a pair are being controlled by one cam, the switch position rotational displacement must be less than 180° as is apparent from the detent holes 24 of FIG. 7A.

In the preferred embodiment, the cams have a general diameter of 1.750 inches. In other words, this is the diameter or radius which must exist to close the associated tube. As is illustrated in FIG. 7C, the cam surface must extend to this diameter illustrated as 29 in dashed outline in order to close the valve; thus B3 is open. Moreover, from examination of FIGS. 7A through 7E, it is apparent that these identical maximum diameters are large enough relative to the number of cam surfaces so that the transition from one surface to another is not unduly abrupt. This would cause operation to be mechanically much stiffer. At the same time, the diameter is not so large as to make rotation of the shaft and cams cumbersome. Furthermore, to ease rotation of the shaft and cams, each of the cams is constructed of self-lubricating material, such as DELRIN plastic (a trademark).

Yet another technique for providing for efficient mechanical operation is to select the various combinations of open and closed valves with regard to either the upper or lower half of the cams so that the opposing forces of for example closed tubes would be equal on both sides. This prevents any bending in the shaft 10'. In addition, because of the compact nature and the double use of the cams for controlling the two valves, a shorter shaft is possible to control simultaneously a great number of fluid paths to again minimize bending.

Thus the present invention has provided an improved valve apparatus.

I claim:

1. Valve apparatus for simultaneously controlling the flow of fluids in a plurality of flow paths comprising:
   a rotatable shaft;
   a plurality of cams mounted in parallel planes on said shaft for rotation therewith, each of said cams having a plurality of cam surfaces;
   detent means for providing a predetermined plurality of switch positions for said shaft and cams;
   a plurality of flexible tubes providing said plurality of flow paths for said fluids, each unique pair of tubes being located in a plane corresponding to a unique one of said cams;
   rigid abutment means located on an opposite side of said tubes relative to said cam surfaces;
   said cam surfaces of said cams having preselected radii from the axis of rotation of said shaft to selectively compress closed a tube against said abutment means when the shaft is rotated to a particular switch position, said pairs of tubes being located opposite each other with respect to said unique one of said cams and each tube of such pair being exclusively associated with a unique half of the number of cam surfaces of such cam.

2. Apparatus as in claim 1 where the rotational displacement of said shaft is less than 180°.

3. Apparatus as in claim 1 including a plurality of levers each associated with a tube and pivoted at one end with the other end on the opposite side of a tube relative to said abutment means and with an intermediate portion of the lever engagable by a cam surface.

4. Apparatus as in claim 3 where said levers are flexible leafs whereby contact with respective tubes is made over a relatively large area compared to said abutment means which are rod shaped.

5. Apparatus as in claim 1 where said cams are composed of self-lubricating material.

6. Apparatus as in claim 1 where said cams have identical maximum diameters which are large enough relative to the number of cam surfaces so that the transistion from one surface to another is not unduly abrupt in that there is not a sharp fine point edge but rather some radius but not too large to make rotation of said cams and shaft cumbersome over a long arc where wearing would occur.

7. Apparatus as in claim 1 where the angular distance between each switch position is at most 360° divided by twice the number of said switch positions.

8. Apparatus as in claim 1 where said valve apparatus is surrounded by an electrically shielding enclosure.

* * * * *